Purified Salmon Egg Proteins
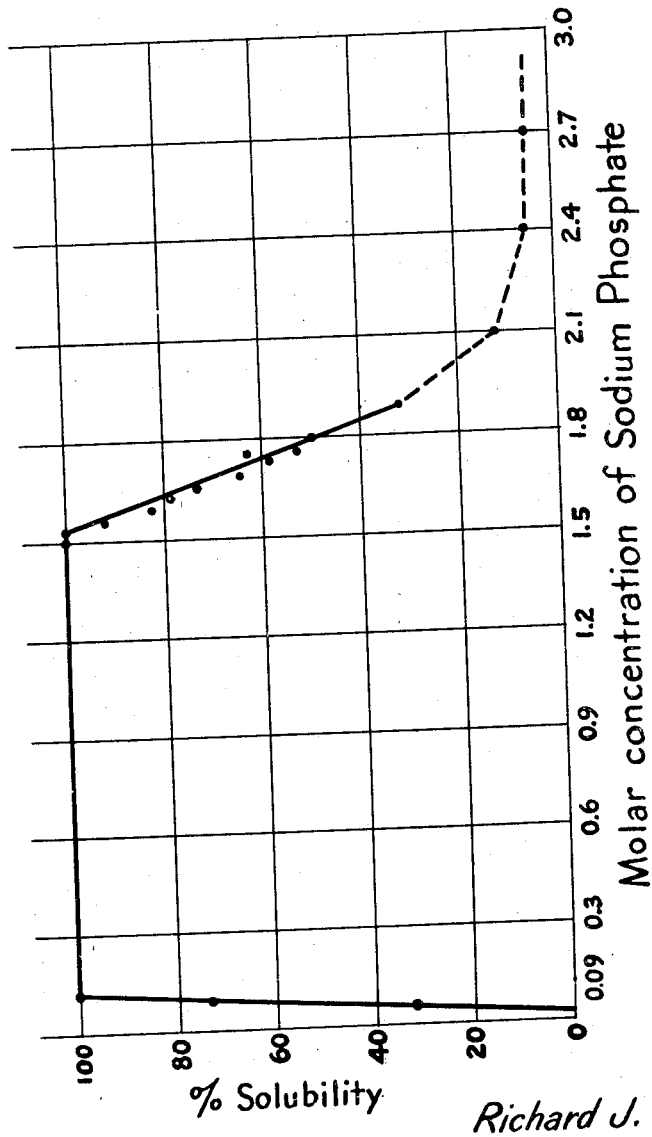
Richard J. Block
Horace N. Brocklesby
Norma I. Rogers
INVENTORS
BY John L. Osmer
ATTORNEY Patented Dec. 27, 1949

2,492,518

UNITED STATES PATENT OFFICE 2,492,518

FISH EGG PROTEINS AND PROCESS FOR PREPARING SAME

Richard J. Block, Scarsdale, N. Y., and Horace N. Brocklesby and Norma I. Rogers, Waterloo, Iowa, assignors to The Borden Company, New York, N. Y., a corporation of New Jersey Application April 23, 1948, Serial No. 22,908

13 Claims. (Cl. 99—18)

This invention relates to soluble proteins and a process for their preparation. The invention particularly relates to stable fish egg proteins soluble in dilute salt solutions.

Heretofore, proteins have been isolated from fish eggs by thoroughly grinding the fish eggs, followed by an extraction with alcohol, ether, or other solvent, which removed all vitamins and fats soluble in those solvents. In such practices it has been necessary to remove the fats from the ground fish eggs because the whole ground fish eggs could not be processed to isolate the proteins due to the formation of a very troublesome emulsion.

The action of organic solvents on the proteins is undesirable because proteins are denatured by the solvent, thus preventing the separation of the indigestible egg membranes from the more digestible proteins. The fat-free material, according to the practice of the prior art, was extracted with water to separate albumins, and the water-insoluble material was then extracted with a 5% to 15% salt solution. The salt solution dissolved the globulins and lipoproteins.

In another method, the oil or fat is separated from ground fish eggs by thoroughly drying the ground fish eggs and extracting the dried material with an organic solvent. This method avoids certain difficulties, as, for example, the tendency of oil and proteins to form stable emulsions, but unfortunately results in the formation of denatured proteins containing egg membranes.

It was therefore an object of this invention to prepare fish egg proteins which are highly soluble in dilute salt solution.

Another object of this invention was to prepare fish egg proteins which are free from unchemically bound oils and fats.

It was still another object of this invention to prepare fish egg proteins which are stable and free from undesirable odors.

Another and further object of this invention was to prepare fish egg proteins having a degree of stability such that they may be stored for long periods of time without the necessity of freezing.

Another object of this invention was to isolate proteins from crushed fish eggs in a substantially quantitative yield.

Still another object of this invention was to prepare a fish egg protein free from unchemically bound oils and fats which is digestible with trypsin.

Other objects and a fuller understanding of the invention may be had by referring to the following description and claims, taken in conjunction with the accompanying drawing.

The drawing is in the form of a graph showing the solubility of purified salmon egg proteins in aqueous sodium phosphate.

It has now been discovered that the proteins of fish eggs may be isolated and separated from the oil or fat present by crushing fish eggs, filtering to remove egg shell membranes, separating oils and fats by simple mechanical means, and extracting the defatted product with an aqueous salt solution having a concentration within the range of 0.09 to 1.5 moles. A fish egg protein may be produced by the process of this invention in a substantially quantitative yield based on the total proteins of fish eggs, and the product of this invention is a protein soluble in dilute salt solutions, insoluble in water, and which is coagulated by heat. Moreover, the product is readily made digestible to trypsin by a very mild treatment with a mineral acid. The process, in general, comprises subjecting fish eggs to a mechanical crushing operation only to the extent necessary to break the egg shell membranes. The egg shell membranes are readily removed from the contents of the eggs by subjecting the crushed eggs to a coarse filtration. The filtrate at this point is not prone to form a troublesome emulsion. The unchemically bound oils and fats are readily removed by mechanical means, for example, by centrifuging. Alternatively, the filtrate may be allowed to stand, whereupon a fairly good separation of the unchemically bound oils and fats is obtained. The said oils and fats form a separate top layer and the heavy protein material may be drawn off from the bottom. This protein layer may then be centrifuged to remove unchemically bound fats which do not separate on standing. Thus, by centrifuging the filtrate or by drawing off the protein-containing layer from a filtrate which has been allowed to stand, followed by centrifuging this protein layer, a fish egg protein is obtained which is substantially free from chemically bound oils and fats.

The total protein material thus obtained is substantially entirely soluble in a dilute aqueous salt solution. All ionizable salts are satisfactory for use in making the aqueous salt solution, such, for example, as sodium chloride, sodium sulfite, potassium phosphate, sodium phosphate, sodium acetate, and the like. The aforesaid proteins are soluble in such dilute aqueous salt solutions to the extent of at least 50% by weight of the salt solution, the solubility depending to some extent upon the particular salt used. When the proteins are dissolved in the aqueous salt solution, the pH of the salt solution may be anywhere within the range of from 1 to 14, but it is preferred to use a salt solution of which the pH is within the range of from 5 to 7. If the preferred pH range is used, the proteins are not denatured; but if the pH of the salt solution is not within the preferred range of 5 to 7 the proteins may become denatured. A concentration of salt solution within the range of from 0.09 to 1.5 molar may be used, but it is preferred that a 0.16 to 1.32 molar salt solution be employed to obtain optimum results.

Referring to the drawing, there is shown a solubility curve of salmon egg proteins in aqueous sodium phosphate solution. The salt solution is given in molar concentration, and the solubility is given in per cent by weight. The solubility curve shows that salmon egg proteins are completely soluble in a 0.09 molar solution of sodium phosphate and that, as the concentration of the salt solution is increased, the proteins stay in solution until the concentration reaches 1.5 molar and that the solubility decreases rapidly if the molar concentration increases above 1.5.

The proteins may be precipitated from solution by the addition of a sufficient amount of water to bring the molar concentration of salt substantially below 0.09 molar. Precipitation is complete in all cases if the protein solution is diluted until the concentration of salt is 0.02 molar. The precipitated proteins may be separated by filtration, redissolved in salt solution, and reprecipitated to accomplish a further purification. The filtrate is substantially nitrogen-free and, since the salmon egg proteins are water-insoluble, the albumin content of the salmon eggs is negligible.

Proteins which have been obtained by a dilution of their salt solution until precipitation occurs and subsequent separation by filtration, or those which have been obtained in dry state by evaporation of the salt solution, may be extracted with ether and the like to remove any unchemically bound oils or fats which may be present. Extraction with water miscible organic solvents denatures the proteins and removes chemically bound fats and oils. The solvent-extracted proteins are tasteless and substantially free from odor. They are also stable when allowed to stand over long periods of time.

The following examples are given by way of illustration but not by way of limiting the invention. All parts are by weight unless otherwise specified.

*Example 1*

1520 grams of frozen salmon eggs were crushed and mixed with 1520 ml. of 0.9% aqueous sodium chloride. The egg shell membranes were removed by passing the crushed eggs through a coarse sieve. The oil layer, which amounted to 5% to 7% of the eggs, was separated by centrifuging the sieved material. The centrifuged proteins were filtered, and the clear red filtrate was evaporated by a current of air. The air-dried residue weighed 440 grams, which amounts to 29% of the whole egg. A nitrogen analysis showed 10.6% nitrogen. The water-soluble vitamins were then removed by dissolving the protein in dilute salt and reprecipitating by diluting with water.

*Example 2*

40 grams of salmon egg proteins prepared according to Example 1 were dissolved in 150 ml. of 0.9% aqueous sodium chloride, and this solution was slowly added with stirring to 5 volumes of water. A white fibrous precipitate was formed and separated by centrifuging and then washed with water in the centrifuge. The precipitate was suspended in 300 ml. of hot methanol, boiled for 10 minutes, cooled, filltered, and washed with 50 ml. of methanol. The fluffy white protein was dried at 105° C. and weighed 32 grams. The analysis showed 14.7% nitrogen and the product was tasteless and substantially without odor.

*Example 3*

25 grams of salmon egg proteins prepared according to Example 1 were dissolved in 225 ml. of 0.9% aqueous sodium chloride. This solution was added to 1250 ml. of water with stirring. A precipitate was formed and, after the mixture had stood for 45 minutes, the supernatant liquid was decanted and the residue centrifuged. The proteins separated by centrifuging were suspended in 150 ml. of isopropanol, stirred, and filtered; the protein material was resuspended in 100 ml. of isopropanol, filtered, and dried. The yield was 19 grams of protein which was tasteless and substantially free from odor. The first alcohol extraction yielded 3.7 grams of oil, and the second alcohol extraction yielded 0.9 gram of oil. The total yield of oil from the two extractions was 4.6 grams, which amounts to 19% of the starting material.

*Example 4*

25 grams of salmon egg proteins prepared according to Example 1 were dissolved in 225 ml. of 0.9% aqueous sodium chloride and precipitated by the addition of 5 volumes of water. The precipitated proteins were separated by filtration and suspended in 150 ml. of methanol, filtered, and resuspended in 100 ml. of methanol, filtered, and dried. The yield of the proteins was 19 grams. The proteins after the first and second suspensions in methanol were tasteless and substantially free from undesirable odors. 1.4 grams of oil were obtained by the first suspension in methanol and 2 grams by the second suspension. The total oil separated by the suspension was 3.4 grams, which is 15% of the starting material.

*Example 5*

25 grams of salmon egg proteins prepared according to Example 1 were dissolved in 50 ml. of a solution containing 0.5 gram of $Na_2SO_3$ and 0.5 gram of $Na_3PO_4$; the pH was adjusted to 7.2 with dilute sodium hydroxide. The solution was clear and brown in color and did not change in color or clarity when kept at room temperature in direct sunlight with daily openings to airborne contamination for 19 days.

*Example 6*

A saturated solution of ammonium sulfate having a pH of 6.0 was slowly added with stirring to a 10% solution, in 0.9% aqueous sodium chloride, of salmon egg proteins prepared according to Example 1 and having a pH of 6.0.

When ammonium sulfate solution in an amount equal to slightly over three-fourths the volume of salmon egg protein solution was added, a precipitate appeared and upon further addition of ammonium sulfate solution further precipitation occurred until a volume of saturated ammonium sulfate solution equal to the volume of the protein solution had been added. The protein precipitated by the half-saturated ammonium sulfate was removed by filtration; the filtrate contained a substantial amount of protein.

Example 7

A 10% solution of salmon egg protein, prepared according to Example 1, in 0.9% aqueous sodium chloride, was heated on a water bath. The solution became cloudy at 74° C., and the cloudiness increased up to a temperature of 82° C.; a definite precipitate was formed at 83° C., and the solution was no longer transparent at 84° C.

Example 8

Example 7 was repeated with the exception that the pH of the solution was adjusted to 5.2, and the concentration of the proteins was reduced to 6%. When this solution was heated in a water bath, it became slightly cloudy at 68° C., and a heavy cloud was formed at 79° C.; the solution became semi-solid at 80° C.; the temperature was then raised to 91° C. and held at that point for a few minutes. The solution was filtered and the filtrate contained a substantial amount of protein which could be precipitated either by dilution with water or by boiling.

Example 9

10 grams of salmon egg proteins prepared according to Example 1 were dissolved in 90 ml. of 0.9% aqueous sodium chloride. The solution was heated to 84°–85° C. and held at that temperature for 10 minutes, whereupon a precipitate was formed. The precipitate was removed by filtration, and the filtrate contained a substantial amount of protein. The precipitate was washed with water and air-dried; the dry product weighed 3.4 grams; analysis showed 11% nitrogen. The filtrate was heated with stirring; there was no precipitate at 85° C., but when heated to 90° C. the solution was semi-solid due to protein precipitation. The temperature of the solution was raised to 100° C. and held at that temperature for 5 minutes and evaporated to dryness. 7½ grams of protein were obtained whose analysis showed 11% nitrogen.

Example 10

10 grams of salmon egg protein prepared according to Example 1 were dissolved in 90 ml. of 0.9% aqueous sodium chloride and 2 ml. of concentrated hydrochloric acid were added with rapid stirring. The pH of the solution was approximately 1.0. The acid solution was heated in a boiling water bath for 40 minutes, at which time precipitation had occurred. This precipitate was readily digested by trypsin.

Example 11

10 parts by weight of 0.8 normal hydrochloric acid were added to salmon egg proteins prepared according to Example 1 and which had been twice suspended in methanol and filtered. The hydrochloric acid added amounted to 1% by weight of the proteins. The pH of this solution was approximately 1.0. The acid solution was heated in a boiling water bath for 45 minutes, and after this time precipitation had occurred. The precipitated protein contained 96% of the nitrogen present in the original unhydrolyzed methanol extracted salmon egg protein. The hydrolyzed protein was readily digestible by trypsin.

The proteins prepared according to this invention may also be precipitated by heat from their dilute aqueous salt solutions. When heated, cloudiness starts to appear at about 70° C., and a definite precipitate is formed before 85° C. is reached. Complete precipitation is not attained, however, until the temperature reaches approximately 100° C. This characteristic behavior is a distinction over those fish egg proteins prepared by prior investigators, since those proteins are defined as being heat-precipitated at 55°–60° C.

A solution of the fish egg proteins in dilute aqueous salt solution prepared according to this invention is stable to sunlight and the solution does not darken on standing at room temperature. Moreover, our fish egg proteins have a low digestibility when subjected to the action of trypsin. Digestibility is increased by a mild acid treatment. Any mineral acid may be used for effecting hydrolysis, preferably at a pH of 1 to 2 and at a temperature of approximately 100° C., and 30 to 45 minutes of heating are required to complete the conversion with the result that the protein is readily digested by trypsin.

A solution of salmon egg protein in dilute aqueous salt solution made in accordance with this invention forms a precipitate when saturated ammonium sulfate solution is added, and when the concentration of the ammonium sulfate in the protein solution is approximately at a point of half-saturation a substantial amount of protein is still retained in the solution. This indicates that it is not possible to make a clear separation between the globulins and any albumins which may be present in fish egg proteins made by the present procedure.

The fish egg proteins prepared according to this invention are distinguishable over those prepared according to the prior art in that they are substantially free from albumins. Moreover, these proteins are substantially vitamin-free.

The fish egg proteins prepared according to this invention are useful in food products and particularly in dog food. Other uses of fish egg protein are in the manufacture of glues and in the manufacture of synthetic protein fibers. One advantage of their use in food products is that they are rich in lysine and the sulfur amino acids are superior to milk proteins in this respect.

The expression "chemically bound oils and fats" as used in this specification and in these claims is intended to means oils and fats present in lipoproteins. The expression "unchemically bound oils and fats" is intended to mean oils and fats which are present in whole fish eggs in a free form, not bound chemically to protein material.

While the invention has been described in detail and according to the preferred manner of carrying out the process, it will be obvious to those skilled in the art after understanding the invention that changes and modifications may be made therein without departing from the spirit or scope of the invention, and it is intended in the appended claims to cover all such changes and modifications.

We claim:
1. A process for preparing salmon egg proteins which comprises crushing salmon eggs, sep- arating egg shell membranes, separating unchemically bound fats from proteins, dissolving the proteins in a salt solution having a molar concentration within the range of 0.09 to 1.5 molar, whereby a dilute salt solution of proteins is obtained.

2. A process for preparing salmon egg proteins which comprises crushing salmon eggs, separating egg shell membranes, separating unchemically bound fats from proteins, dissolving the proteins in a salt solution having a molar concentration within the range of 0.09 to 1.5 molar, diluting the solution with water until the molar concentration of the salt is below 0.02 molar, whereby substantially all proteins are precipitated, and separating the proteins from the salt solution.

3. A process for preparing salmon egg proteins which comprises crushing salmon eggs, separating egg shell membranes, centrifuging the egg contents, whereby unbound fats are separated from the protein, dissolving the proteins in a salt solution having a molar concentration within the range of 0.16 to 1.32 molar, diluting the solution with water until the molar concentration of the salt is below 0.02 molar, whereby substantially all proteins are precipitated, and separating the proteins from the salt solution.

4. A process for preparing salmon egg proteins, high in digestibility, which comprises crushing salmon eggs, separating egg shell membranes, separating unchemically bound fats from proteins, dissolving the proteins in a salt solution having a molar concentration within the range of 0.09 to 1.5 molar, diluting the solution with water until the molar concentration of the salt is below 0.02 molar, whereby substantially all proteins are precipitated, separating the proteins from the salt solution, heating the proteins in dilute salt solution which has been made acid with mineral acid until precipitation is complete, and separating the proteins.

5. A process for preparing salmon egg proteins, high in digestibility, which comprises crushing salmon eggs, separating egg shell membranes, centrifuging the egg contents, whereby unbound fats are separated from the protein, dissolving the proteins in a salt solution having a molar concentration within the range of 0.16 to 1.32 molar, diluting the solution with water until the molar concentration of the salt is below 0.02 molar, whereby substantially all proteins are precipitated, separating the proteins from the salt solution, heating the proteins in dilute salt solution which has been made acid with mineral acid until precipitation is complete, and separating the proteins.

6. A process for preparing salmon egg proteins which comprises crushing salmon eggs, separating egg shell membranes, centrifuging the egg contents, whereby unbound fats are separated from the protein, dissolving the proteins in a salt solution having a pH within the range of from 5 to 7, and having a molar concentration within the range of 0.09 to 1.5 molar, diluting the solution with water until the molar concentration of the salt is below 0.02 molar, whereby substantially all proteins are precipitated, and separating the proteins from the salt solution.

7. A process for preparing salmon egg proteins which comprises crushing salmon eggs, separating egg shell membranes, centrifuging the egg contents, whereby unbound fats are separated from the protein, dissolving the proteins in a dilute salt solution having a pH within the range of from 5 to 7, and having a molar concentration within the range of 0.16 to 1.32 molar, diluting the solution with water until the molar concentration of the salt is below 0.02 molar, whereby substantially all proteins are precipitated, and separating the proteins from the salt solution.

8. A process for preparing salmon egg proteins which comprises crushing salmon eggs, separating egg shell membranes, separating unchemically bound fats from proteins, dissolving the proteins in a salt solution having a pH within the range of from 5 to 7, and having a molar concentration within the range of 0.16 to 1.32 molar, diluting the solution with water until the molar concentration of the salt is below 0.02 molar, whereby substantially all proteins are precipitated, and separating the proteins from the salt solution.

9. A process for preparing salmon egg proteins which comprises crushing salmon eggs, separating egg shell membranes, separating unchemically bound fats from proteins, dissolving the proteins in a salt solution having a molar concentration within the range of 0.09 to 1.5 molar, diluting the solution with water until the molar concentration of the salt is below 0.02 molar, whereby substantially all proteins are precipitated, separating the proteins from the salt solution, and extracting the proteins with an organic solvent.

10. A process for preparing salmon egg proteins which comprises crushing salmon eggs, separating egg shell membranes, separating unchemically bound fats from proteins, dissolving the proteins in a salt solution having a molar concentration within the range of 0.09 to 1.5 molar, diluting the solution with water until the molar concentration of the salt is below 0.02 molar, whereby substantially all proteins are precipitated, separating the proteins from the salt solution, and extracting the proteins with methanol.

11. A process for preparing salmon egg proteins, high in digestibility, which comprises crushing salmon eggs, separating egg shell membranes, separating unchemically bound fats from proteins, dissolving the proteins in a salt solution having a molar concentration within the range of 0.09 to 1.5 molar, diluting the solution with water until the molar concentration of the salt is below 0.02 molar, whereby substantially all proteins are precipitated, separating the proteins from the salt solution, extracting the proteins with methanol, suspending the methanol extracted proteins in dilute mineral acid, and heating the mineral acid protein solution until all the proteins have been precipitated.

12. A process for preparing salmon egg proteins, high in digestibility, which comprises crushing salmon eggs, separating egg shell membranes, centrifuging the egg contents, whereby unbound fats are separated from the protein, dissolving the proteins in a salt solution having a molar concentration within the range of 0.09 to 1.5 molar, diluting the solution with water until the molar concentration of the salt is below 0.02 molar, whereby substantially all proteins are precipitated, separating the proteins from the salt solution, dissolving the proteins in a salt solution having a concentration within the range of 0.09 to 1.5 molar, making the solution acid with mineral acid, and heating the acidified solution until the proteins are precipitated.

13. Salmon egg proteins prepared by crushing salmon eggs, separating the contents of the eggs from the egg shell membranes, separating unchemically bound fats from the proteins, dissolving the proteins in a salt solution having a molar concentration within the range of 0.09 to 1.5 molar, diluting the solution with water until the molar concentration of the salt is below 0.02 molar, whereby substantially all proteins are precipitated, and separating the proteins from the solution.

RICHARD J. BLOCK.
HORACE N. BROCKLESBY.
NORMA I. ROGERS.

REFERENCES CITED

The following references are of record in the file of this patent:

"Chemistry of the Amino Acids and Proteins" by Schmidt, Charles C. Thomas, Springfield, Illinois, Baltimore, Maryland, 1938 pgs. 942-948.